(12) United States Patent
Han

(10) Patent No.: US 12,151,953 B2
(45) Date of Patent: Nov. 26, 2024

(54) WATER PURIFIER THAT DISPENSES PURIFIED WATER AND HOT WATER THROUGH ONE FLOW PATH

(71) Applicant: LG ELECTRONICS INC., Seoul (KR)

(72) Inventor: Dongkoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 17/554,408

(22) Filed: Dec. 17, 2021

(65) Prior Publication Data

US 2022/0204361 A1    Jun. 30, 2022

(30) Foreign Application Priority Data

Dec. 28, 2020   (KR) .......................... 10-2020-0184981

(51) Int. Cl.
*C02F 1/00* (2023.01)
*B67D 1/00* (2006.01)
(Continued)

(52) U.S. Cl.
CPC ............ *C02F 1/008* (2013.01); *B67D 1/0014* (2013.01); *B67D 1/0895* (2013.01);
(Continued)

(58) Field of Classification Search
CPC .. C02F 1/008; C02F 1/003; C02F 1/02; C02F 2201/005; C02F 2209/02; C02F 2209/40;
(Continued)

(56) References Cited

U.S. PATENT DOCUMENTS 7,207,189 B2 *   4/2007  An ....................... B67D 1/0895
                                                        165/63
2014/0086565 A1    3/2014  Lilley et al.
(Continued)

FOREIGN PATENT DOCUMENTS

CN          107473290 A  * 12/2017
KR       20080001882 U  * 12/2006
(Continued)

OTHER PUBLICATIONS

Jewook, KR20190014029 A, English machine translation (Year: 2019).*
(Continued)

*Primary Examiner* — Hayden Brewster
(74) *Attorney, Agent, or Firm* — KED & Associates LLP

(57) ABSTRACT

The present disclosure relates to a water purifier that ejects hot water and purified water, and the water purifier includes a housing forming a storage space, a filter provided inside the housing to purify water supplied from an external water supply source, a water ejection nozzle provided on the outside of the housing and configured to eject the water passing through the filter, a hot water module forming a heating flow path through which the purified water passing through the filter passes and configured to instantaneously heat the purified water passing through the heating flow path into hot water when hot water is ejected, a hot water flow path configured to guide the hot water passing through the hot water module toward the water ejection nozzle; and a controller configured to control the operation of the hot water module, in which, when purified water is ejected, the controller turns off the hot water module, and the purified water discharged from the hot water module is ejected to the water ejection nozzle through the hot water flow path.

19 Claims, 6 Drawing Sheets

(51) Int. Cl.
 *B67D 1/08* (2006.01)
 *B67D 1/12* (2006.01)
 *C02F 1/02* (2023.01)

(52) U.S. Cl.
 CPC ............ *B67D 1/1279* (2013.01); *C02F 1/003* (2013.01); *C02F 1/02* (2013.01); *B67D 2210/0001* (2013.01); *C02F 2201/005* (2013.01); *C02F 2209/02* (2013.01); *C02F 2209/40* (2013.01); *C02F 2209/44* (2013.01); *C02F 2303/04* (2013.01); *C02F 2303/16* (2013.01); *C02F 2307/10* (2013.01)

(58) Field of Classification Search
 CPC .............. C02F 2209/44; C02F 2303/04; C02F 2303/16; C02F 2307/10; C02F 1/001; C02F 2209/005; C02F 9/20; B67D 1/0014; B67D 1/0895; B67D 1/1279; B67D 2210/0001; B67D 1/0864; B67D 1/1218; B67D 1/124; B67D 1/0884; B67D 1/0081; B67D 1/0857; B67D 1/1206; B67D 2210/00031
 USPC ........................................................ 210/137
 See application file for complete search history.

(56) References Cited

U.S. PATENT DOCUMENTS

| | | | |
|---|---|---|---|
| 2017/0291807 A1† | 10/2017 | Jeon | |
| 2018/0118580 A1* | 5/2018 | Park | B67D 7/76 |
| 2018/0354776 A1 | 12/2018 | Lee et al. | |
| 2019/0218109 A1* | 7/2019 | Jang | C02F 1/003 |
| 2019/0308865 A1 | 10/2019 | Yu et al. | |
| 2020/0270150 A1† | 8/2020 | Jeon | |
| 2020/0354210 A1* | 11/2020 | Lee | E03C 1/044 |
| 2020/0384393 A1 | 12/2020 | Yoon et al. | |

FOREIGN PATENT DOCUMENTS

| | | | |
|---|---|---|---|
| KR | 10-2007-0083008 | | 8/2007 |
| KR | 10-2009-0043785 | | 5/2009 |
| KR | 10-2012-0088318 | | 8/2012 |
| KR | 20140071833 A | * | 6/2014 |
| KR | 10-2016-0085579 | | 7/2016 |
| KR | 10-2017-0116457 | | 10/2017 |
| KR | 10-2019-0010596 | | 1/2019 |
| KR | 20190014029 A | * | 2/2019 |
| KR | 20-2008-0001882 U | † | 8/2019 |
| KR | 102013632 B1 | * | 8/2019 |
| KR | 102101802 B1 | * | 4/2020 |
| KR | 20200111366 A | * | 9/2020 |
| KR | 10-2020-0134193 | | 12/2020 |

OTHER PUBLICATIONS

Xu, CN107473290 A, English machine translation (Year: 2017).*
Kim, KR20140071833 A, English machine translation (Year: 2014).*
Lee 2, KR20080001882 U, English machine translation (Year: 2008).*
An Jung, KR20200111366 A, English machine translation (Year: 2020).*
Kim 2, KR102013632 B1, English machine translation (Year: 2019).*
Jewook 2, KR102101802 B1, English machine translation (Year: 2020).*
European Communication dated Nov. 23, 2022 issued in Application No. 21218016.0.
European Search Report dated Jun. 3, 2022 issued in Application No. 21218016.0.

* cited by examiner
† cited by third party

WATER PURIFIER THAT DISPENSES PURIFIED WATER AND HOT WATER THROUGH ONE FLOW PATH

CROSS-REFERENCE TO RELATED APPLICATION

The present application claims priority under 35 U.S.C. 119 and 35 U.S.C. 365 to Korean Patent Application No. 10-2020-0184981 (filed on Dec. 28, 2020), which is hereby incorporated by reference in its entirety.

BACKGROUND OF THE DISCLOSURE

Field of the Disclosure

The present specification relates to a water purifier in which purified water is ejected through a hot water flow path.

Discussion of the Related Art

In general, a water purifier is a device that filters raw water and supplies the purified water to the user and is a device that allows the user to take out a desired amount of water at a desired temperature according to the user's manipulation.

Such a water purifier may normally take out filtered water through a nozzle when a user manipulates a lever or a button. In detail, the water purifier is configured so that the valve of the nozzle is opened and filtered water can be taken out while the user manipulates the lever or button, and the user can end the manipulation of the lever or button while checking the amount of water filled in the cup or container.

Such a water purifier may be provided as a water purifier itself or may be mounted on a refrigerator or the like.

In Prior Document 1 (Korean Patent Publication No. 2019-0010596), a water purifier is disclosed which includes a case having a storage space, a filter provided inside the case to purify the water supplied from the water supply source, a supply water flow path supplying water supplied from the water supply source to the filter, a water supply valve provided on the water supply flow path to control the flow of water passing through the water supply flow path, a water ejection nozzle provided outside the case to take out the water passing through the filter, a water ejection flow path supplying water which has passed through the filter to the outside of the case, a water ejection valve provided on the water ejection flow path to control the flow of water passing through the water ejection flow path, a manipulation part which receive a washing command from a user, and a controller which controls to intermittently open or close at least one of the water supply valve and the water ejection valve when a washing command is input to the manipulation part.

In addition, in Prior Document 2 (Korean Patent Publication No. 2007-0083008), a direct-type water purifying device employing an RO membrane module is disclosed. The disclosed direct-type water purifying device includes a purified water storage tank in which purified water is temporarily stored, a first connection pipe providing a flow path to supply purified water flowing through a purified water discharge pipe to the purified water storage tank, a second connection pipe providing a flow path so that the purified water stored in the purified water storage tank flows in the RO membrane module, a booster pump installed on the path of the raw water supply pipe to increase the supply pressure of raw water, and a controller which controls, when the faucet is locked, to detect this and then to supply purified water discharged through the purified water discharge pipe to the purified water storage tank and to supply the purified water stored to the RO membrane module in a case where a predetermined amount of purified water is stored in the purified water storage tank.

In the case of the conventional water purifier as described above, when purified water is ejected, if a 'purified water' button is selected and then a 'water ejection' button is pressed, then the water purification valve is opened, purified water flows through the purified water flow path, and purified water is ejected through the water ejection nozzle.

In addition, in the case of the conventional water purifier as described above, when hot water is ejected, if the 'water ejection' button is pressed after the 'hot water' button is selected, then the hot water valve is opened, and the hot water heated in the hot water tank flows through the hot water flow path, and thus hot water is ejected through the water ejection nozzle.

In other words, in the case of a conventional water purifier, a hot water flow path and a purified water flow path are separately formed, hot water is supplied to the water ejection nozzle through a hot water flow path and a hot water valve, and purified water is supplied to the water ejection nozzle through a purified water flow path and a purified water valve.

SUMMARY OF THE DISCLOSURE

An object of the present disclosure is to provide a water purifier which implements to eject hot water and purified water through a hot water flow path and a hot water valve, without having a separate purified water flow path and a separate water purification valve, thereby reducing material costs due to the provision of a purified water flow path and a water purification valve.

In addition, an object of the present disclosure is to provide a water purifier which eliminates the configuration of the purified water flow path and the purified water valve, thereby increasing the internal space utilization of the water purifier and being capable of miniaturized.

In addition, an object of the present disclosure is to provide a water purifier capable of increasing the water ejection flow rate of purified water while satisfying the temperature condition of hot water by adjusting the opening degree of the flow rate adjusting valve differently when hot water is ejected and purified water is ejected.

In addition, an object of the present disclosure is to provide a water purifier which is capable of maintaining the temperature condition of ejected purified water in a satisfactory state by lowering the temperature of water ejected through cold water so that the temperature of purified water ejected by residual hot water does not increase, in a case where the purified water is ejected after the hot water is ejected.

In order to achieve the objects described above, the present disclosure includes a housing forming a storage space, a filter provided inside the housing to purify water supplied from an external water supply source, a water ejection nozzle provided on the outside of the housing and configured to eject the water passing through the filter, a hot water module forming a heating flow path through which the purified water passing through the filter passes and configured to instantaneously heat the purified water passing through the heating flow path into hot water when hot water is ejected, a hot water flow path configured to guide the hot water passing through the hot water module toward the water ejection nozzle, and a controller configured to control the operation of the hot water module.

In addition, a water purifier is provided in which, when purified water is ejected, the controller turns off the hot water module, and the purified water discharged from the hot water module is ejected to the water ejection nozzle through the hot water flow path.

In addition, a water purifier is provided in which a hot water valve configured to control the flow of water flowing through the hot water flow path is installed in the hot water flow path and when hot water is ejected and purified water is ejected, the controller opens the hot water valve.

In addition, a water purifier is provided in which when hot water is ejected, the controller turns on the hot water module and the hot water discharged from the hot water module is ejected to the water ejection nozzle through the hot water flow path.

In addition, a water purifier is provided in which the filter and the hot water module are connected through a water ejection flow path and the flow rate adjusting valve which adjusts flow rate of water flowing to the hot water module is installed in the water ejection flow path.

In addition, a water purifier is provided in which a temperature sensor configured to sense the temperature of water flowing toward the hot water module through the water ejection flow path is installed in the water ejection flow path.

In addition, a water purifier is provided in which a feed valve configured to control the flow of purified water flowing through the water ejection flow path after passing through the filter is installed in the water ejection flow path.

In addition, a water purifier is provided in which a flow rate sensor configured to sense a flow rate of purified water flowing through the water ejection flow path after passing through the filter is installed in the water ejection flow path.

In addition, a water purifier is provided in which the flow rate adjusting valve adjusts an opening degree by the controller and an opening degree of the flow rate adjusting valve when hot water is ejected and an opening degree of the flow rate adjusting valve when purified water is ejected are adjusted to be different.

In addition, a water purifier is provided in which the opening degree of the flow rate adjusting valve, when hot water is ejected, is adjusted to be smaller than the opening degree of the flow rate adjusting valve when purified water is ejected.

In addition, a water purifier is provided in which, when purified water is ejected, the opening degree of the flow rate adjusting valve is adjusted to the maximum.

In addition, a water purifier is provided which further includes a cold water flow path having one side branched from the water ejection flow path between the filter and the flow rate adjusting valve and the other side connected to the water ejection nozzle side, and a cold water module installed in the cold water flow path to cool the purified water passing through the cold water flow path to cold water.

In addition, a water purifier is provided in which a cold water valve configured to control the flow of water branched from the water ejection flow path and flowing to the cold water module is installed in the cold water flow path.

In addition, a water purifier is provided in which, when purified water is ejected, the cold water valve and the hot water valve are simultaneously opened.

In addition, a water purifier is provided in which the controller includes a timer, and, after hot water is ejected after a reference time has elapsed when purified water is ejected, the controller shuts off the cold water valve and opens the hot water valve.

In addition, a water purifier is provided in which the controller includes a timer, and after hot water is ejected before a reference time has elapsed when purified water is ejected, the cold water valve and the hot water valve are opened at the same time.

In addition, a water purifier is provided in which after hot water is ejected before a reference time has elapsed when purified water is ejected, the cold water valve and the hot water valve are opened at the same time, the cold water valve is closed after being opened for the first time, and the hot water valve is opened for a second time longer than the first time.

In addition, a water purifier is provided in which the water discharged through the cold water flow path and the hot water flow path are merged and then discharged through the water ejection nozzle.

DESCRIPTION OF SPECIFIC EMBODIMENTS

Figure 1:
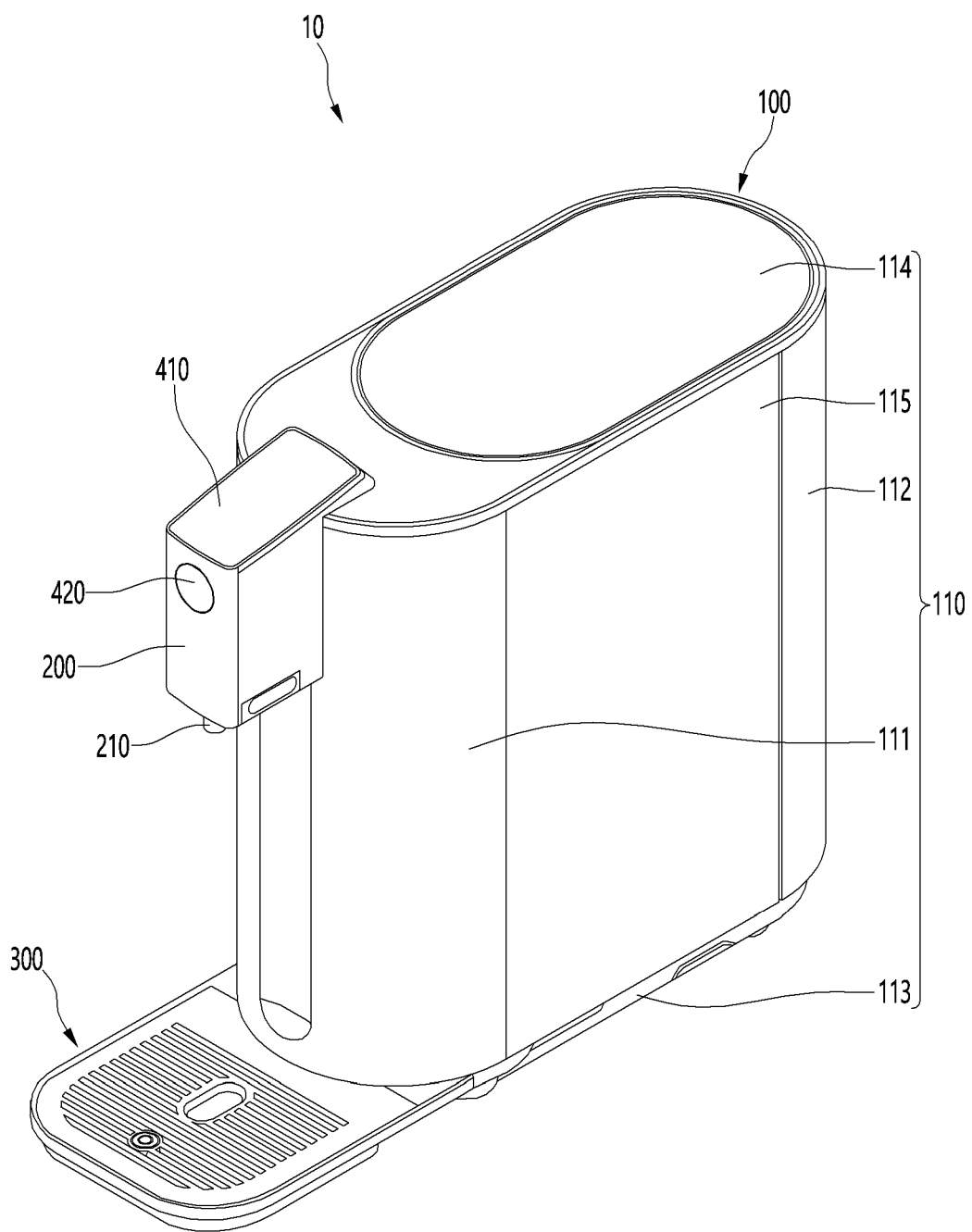
FIG. 1 is a perspective view illustrating a water purifier according to an embodiment of the present disclosure.

Hereinafter, some embodiments of the present disclosure will be described in detail with reference to the exemplary drawings. It should be noted that when components in each of the drawings are designated by reference numerals, the same components have the same reference numerals as far as possible even though the components are illustrated in different drawings. Further, in description of embodiments of the present disclosure, when it is determined that detailed descriptions of related known configurations or functions disturb understanding of the embodiments of the present disclosure, the detailed descriptions thereof will be omitted.

Figure 2:
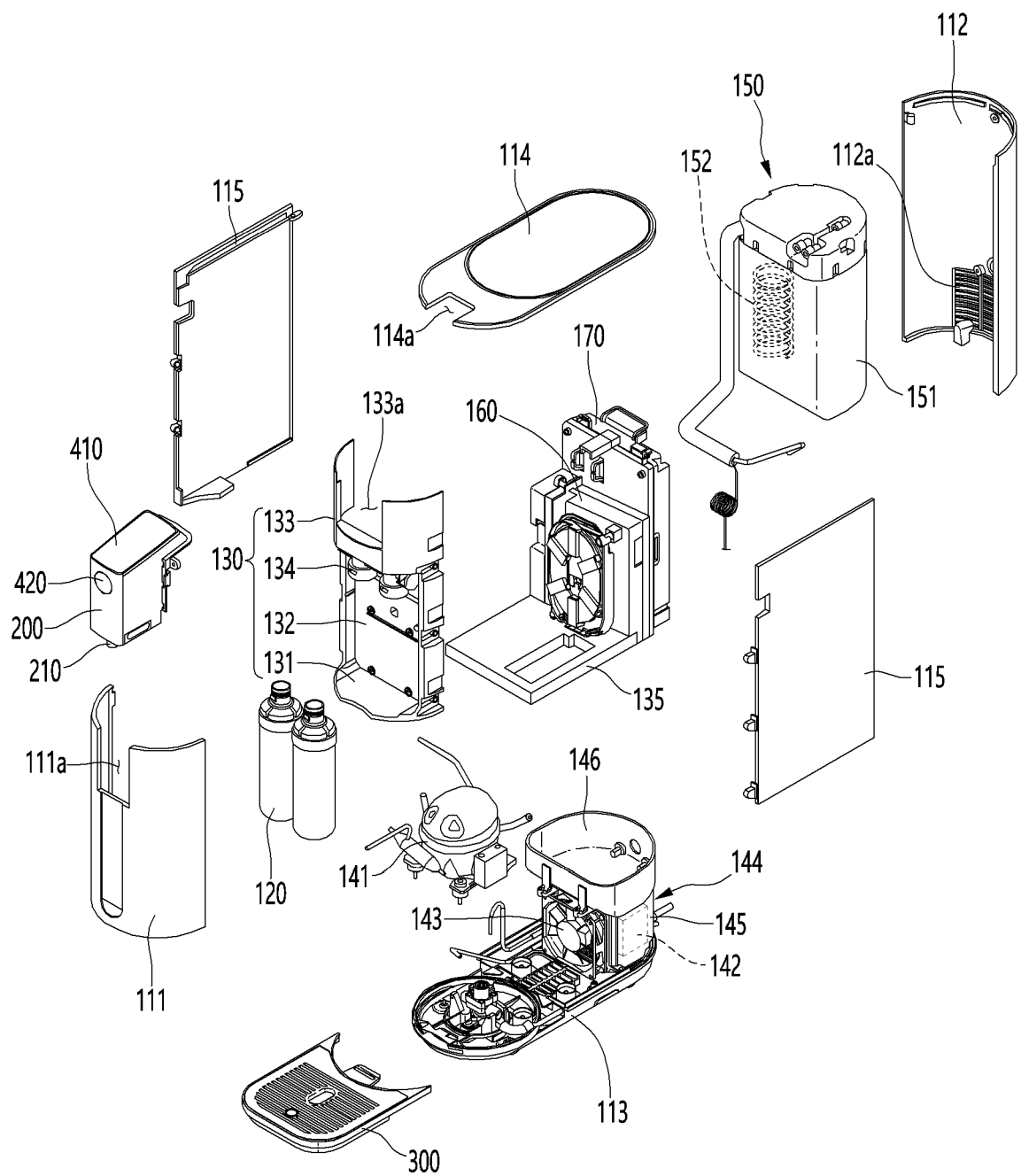
FIG. 2 is an exploded perspective view illustrating the water purifier.

FIG. 1 is a perspective view illustrating a water purifier according to an embodiment of the present disclosure, and FIG. 2 is an exploded perspective view illustrating the water purifier.

Referring to FIGS. 1 to 2, the water purifier 10 according to an embodiment of the present disclosure includes a housing 110 having a storage space inside and forming an outer shape of the water purifier, a water purifier main body 100 including a filter 120 provided in the inside of the housing 110 to filter raw water flowing from the outside therein, a water ejection module 200 in which a water ejection nozzle 210 at least a portion of which is formed to protrude in front of the water purifier main body 100 and which supplies water passing through the filter 120 to the outside of the water purifier main body 100, and a tray 300 provided below the water ejection nozzle 210.

First, the outer shape of the water purifier main body 100 may be formed by the housing 110. The housing 110 includes a front cover 111 forming an outer appearance of a front surface, a rear cover 112 forming an outer appearance of a rear surface, a base 113 forming a lower surface, a top cover 114 forming an upper surface, and side panels 115 forming both sides in the left and right direction. The front cover 111, the rear cover 112, the base 113, the top cover 114, and the pair of side panels 115 are assembled with each other and thus can form a housing 110 that forms the outer appearance of the water purifier main body 100.

At this time, the front and rear ends of the base 113 and the top cover 114 may be formed to be round, and the front cover 111 and the rear cover 112 may be respectively convexly formed in the front and rear direction to have a curvature corresponding to the front and rear ends of the base 113 and the top cover 114 which are formed to be round as described above.

In addition, the water ejection nozzle 210 is formed on the front surface of the water purifier main body 100. In addition, at least a portion of the water ejection nozzle 210 may be formed to protrude downward of the water ejection module 200 formed to protrude forward of the front cover 111. Accordingly, purified water may be taken out through the water ejection nozzle 210.

A filter bracket 130 in which a filter 120, a valve (not illustrated), and the like for water purification are mounted inside the housing 110 is provided.

The filter bracket 130 may be composed of a bottom portion 131 coupled to the base 113, a filter accommodating part 132 in which the filter 120 is accommodated, and a water ejection module mounting part 133 on which the water ejection module 200 is mounted.

In detail, the bottom portion 131 is formed to correspond to the shape of the front end of the base 113 and is coupled to the base 113. The mounting position of the filter bracket 130 may be fixed by the coupling of the bottom part 131, and the shape of the bottom surface of the filter accommodating part 132 may be formed.

The filter bracket 130 may be engaged and constrained by a hook method on the base 113 and may also be fixed by a screw fastened on the lower surface of the base 113.

The filter accommodating part 132 is formed extending in the vertical direction and forms a space recessed from the front (left in the drawing) to the rear (right in the drawing) so that the filter 120 can be accommodated. A plurality of filters 120 may be mounted on the filter accommodating part 130. The filter 120 is for purification of supplied raw water (tap water) and may be configured to combine filters having various functions.

In addition, the filter accommodating part 130 may further include a filter socket 134 in which the filter 120 is mounted, and a pipe for flowing purified water is provided in the filter socket 134, and the pipe may be connected to a plurality of valves (not illustrated). Therefore, the raw water passes through the filter 120 in turn and then can be directed to a valve (not illustrated) for water supply.

A plurality of valves (not illustrated) may be provided on the rear surface (right side of the drawing) of the filter accommodating part 132. In addition, the valves (not illustrated) selectively supply purified water passing through the filter 120, cold water cooled while passing through the cold water module 150, and hot water heated while passing through the hot water module 160 to the water ejection nozzle 210.

The water ejection module mounting part 133 is formed at the upper end of the filter accommodating part 132. The water ejection module mounting part 133 has a structure in which the water ejection module 200 can be inserted and fixed by having a mounting groove 133a formed at the upper end from the upper portion to the lower portion. In this case, the water ejection module mounting part 133 may be formed to have a curvature corresponding to the curvature of the front cover 111 covering the front of the water ejection module mounting part 133. An upper portion of the filter bracket 130 may be shielded by a top cover 114.

A compressor 141 and a condenser 142 are provided on the upper surface of the base 113. In addition, a cooling fan 143 is provided between the compressor 141 and the condenser 142 to enable cooling of the compressor 141 and the condenser 142. The compressor 141 may be an inverter type compressor capable of adjusting the cooling capacity by varying the frequency. Therefore, cooling of the purified water can be efficiently performed, thereby reducing power consumption.

In addition, the condenser 142 is located at the rear of the base 113 and may be located at a position corresponding to the discharge port 112a formed in the rear cover 112. The condenser 142 may be formed by bending a flat tube type refrigerant pipe a plurality of times in order to efficiently use space and improve heat exchange efficiency at the same time and is configured to be accommodated in the condenser bracket 144.

The condenser bracket 144 has a condenser mounting part 145 to which the condenser 142 is fixed, and a tank mounting part 146 on which a cooling tank 151 of the cold water module 150 for making cold water may be mounted. The condenser mounting part 145 forms a space having a shape corresponding to the overall shape of the condenser 142 to be capable of accommodating the condenser 142. In addition, the condenser mounting part 145 is formed such that portions facing the cooling fan 143 and the discharge port 112a are opened, respectively, so that effective cooling of the condenser 142 is possible.

In addition, the tank mounting part 146 is formed above the condenser bracket 144, that is, above the condenser mounting part 145. The lower end portion of the cooling tank 151 of the cold water module 150 is inserted into the tank mounting part 146, and the tank mounting part 146 fixes the cooling tank 151.

The cooling tank 151 is to make cold water by cooling the purified water, and the cooling water for heat exchange with the purified water flowing therein is filled. In addition, in the cooling tank 151, an evaporator for cooling the cooling water is accommodated, and a cooling flow path 152 is formed so that the purified water passing through the filter 120 can pass through the inside of the cooling tank 151. Accordingly, the purified water may be cooled while circulating in the cooling tank 151 along the cooling flow path 152.

One side of the filter bracket 130 is further provided with a support plate 135 extending toward the cooling tank 150. The support plate 135 is provided above the compressor 141 and extends from the filter bracket 130 to the condenser bracket 144 to provide a space in which the hot water module 160 and the controller 170 are mounted.

The hot water module 160 may mean a heating assembly for making hot water, and the controller 1700 may mean a control assembly for controlling the overall operation of the water purifier 10. The hot water module 160 and the controller 170 may be coupled to each other to form a single module and may be mounted on the support plate 135 in a coupled state.

The hot water module 160 is for heating purified water and may heat purified water in various known methods, including an induction heating (IH) method. The hot water module 160 can heat water immediately and at a high speed when hot water is taken out, and hot water of a desired temperature can be taken out according to a user's manipulation.

The controller 170 is to control the operation of the water purifier 10 and is configured to be capable of controlling the compressor 141, the cooling fan 143, and various valves and sensors, the hot water module 160, or the like. The controller 170 may be modularly configured by a combination of PCBs divided into a plurality of parts for each function. In addition, in a structure in which the water purifier 10 takes out only cold water and purified water, the hot water module 160 and a PCB for controlling the same may be omitted, and at least one PCB may be omitted in this way.

Meanwhile, the purified water ejected from the filter 120 of the water purifier 10 passes through several flow paths and valves until taken out to the water ejection nozzle 210.

Figure 3:
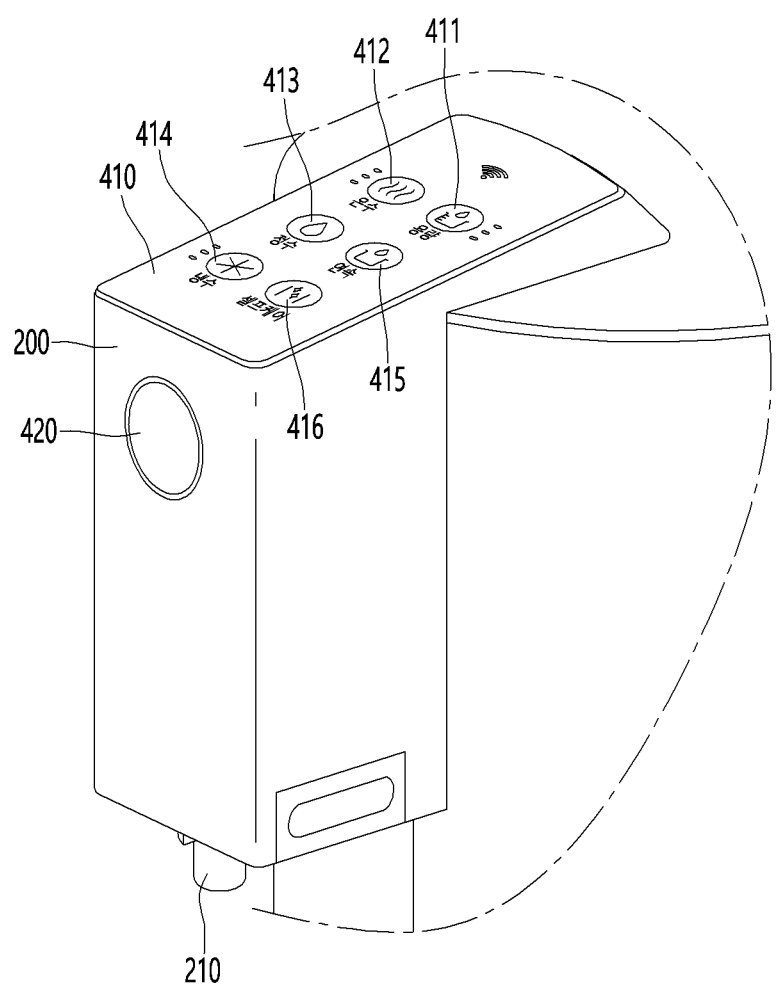
FIG. 3 is a perspective view illustrating the water ejection module, which is a component of the present disclosure.
Figure 4:
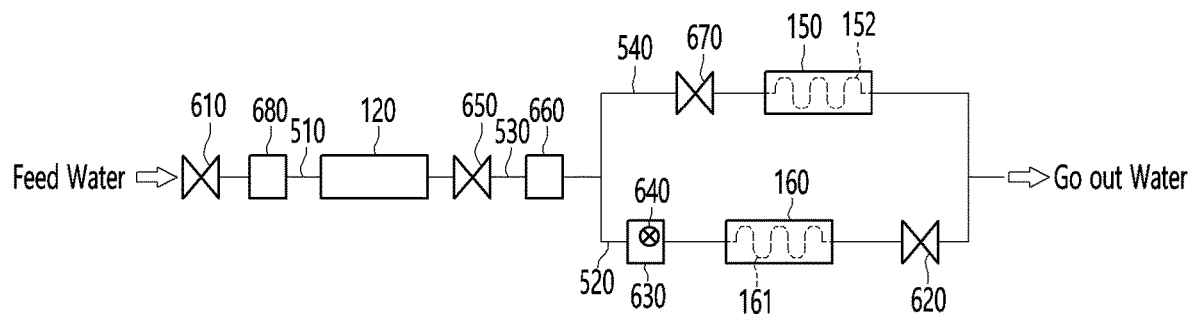
FIG. 4 is a block diagram illustrating the configuration of a water purifier according to an embodiment of the present disclosure.
Figure 5:
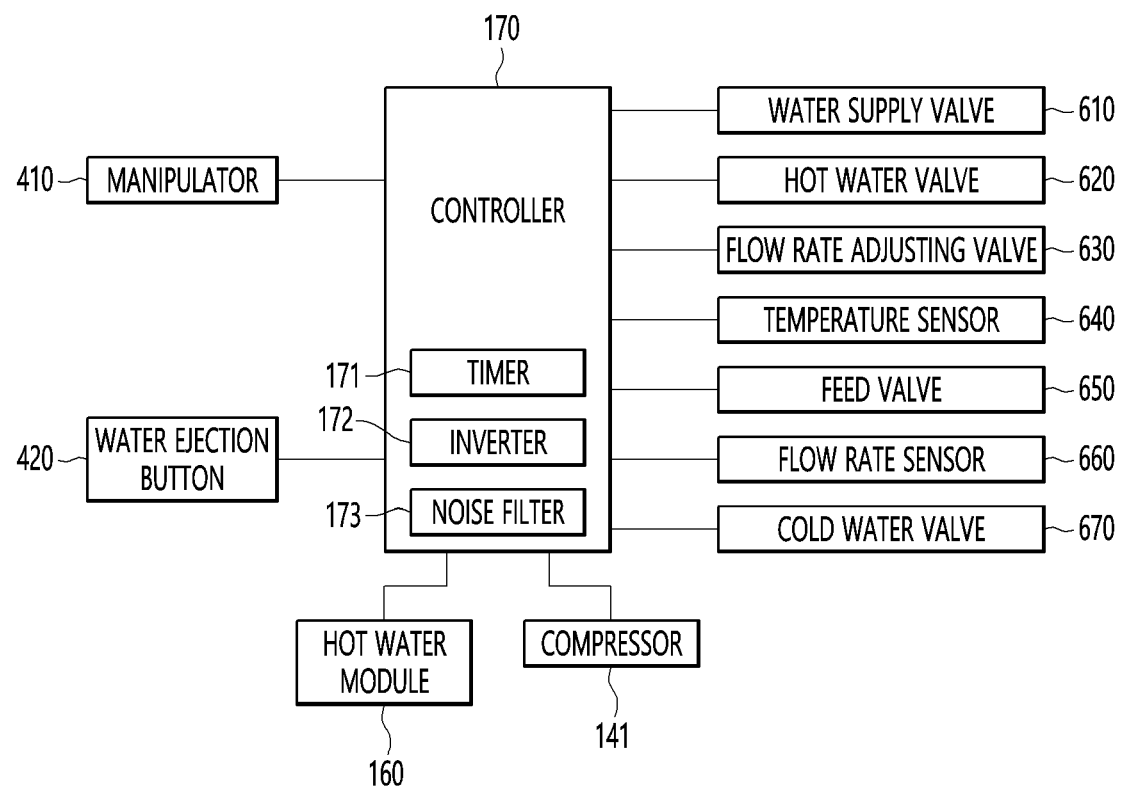
FIG. 5 is a water pipe diagram of a water purifier according to an embodiment of the present disclosure.

FIG. 3 is a perspective view illustrating the water ejection module, which is a component of the present disclosure, FIG. 4 is a block diagram illustrating the configuration of a water purifier according to an embodiment of the present disclosure, and FIG. 5 is a water pipe diagram of a water purifier according to an embodiment of the present disclosure.

Referring to FIGS. 3 to 5, the water purifier of the present disclosure has a function of ejecting purified water and hot water. In addition, the water purifier may include a manipulator 410 which receives a water ejection command from a user and a controller 170 that controls various valves to open or close when a water ejection command is input to the manipulator 410.

In this embodiment, the manipulator 410 may be provided on the upper surface or the front surface of the water ejection module 200 or the water purifier main body 100, and a water ejection button 420 may be provided in the front surface of the water ejection module 200 or the water purifier main body 100.

As an example, the manipulator 410 is provided with a touch panel and may include a capacity button 411 for selecting a water ejection capacity, a hot water button 412 for selecting hot water, and further selecting the temperature of the hot water to be ejected, a water purifying button 413 for selecting purified water, a cold water button 414 for selecting cold water, a continuous button 415 for selecting continuous water ejection, and a washing button 416 for inputting a sterilization command and/or a washing command.

In addition, the manipulator 410 may be formed to be inclined downward from the rear to the front. Accordingly, a user located in front of the water purifier may manipulate the manipulator 410 in a state where readability is secured.

In addition, the controller 170 may include an inverter 172. The inverter 172 may adjust the amount of heating by controlling the amount of current applied to the heating source of the hot water module 160. In other words, the output of the hot water module 160 may be adjusted by the inverter 172.

In a case where the amount of heating is adjusted in this way, the water may be heated to a temperature desired by the user.

In addition, the controller 170 may further include a noise filter 173. The noise filter 173 serves to remove noise from a signal including noise generated by a magnetic field generated by a current applied to the hot water module 160.

The noise filter 173 may control noise in a control signal output from the controller 170 and applied to various valves, or the like.

In addition, the controller 170 may include a timer 171 for measuring the elapsed time after the hot water is ejected.

The water purifier according to the present disclosure ejects hot water and purified water, and the hot water and purified water are ejected through one flow path and one valve.

In detail, purified water passing through the filter 120 passes through the hot water flow path and the hot water module 160 and is discharged to the water ejection nozzle 210.

At this time, if power is supplied to the hot water module 160 and purified water is heated in the hot water module 160, then hot water is ejected to the water ejection nozzle 210.

In addition, when the power to the hot water module 160 is blocked, the purified water that has passed through the hot water module 160 is not heated and is ejected to the water ejection nozzle 210 as a state of purified water.

In other words, in the case of the present disclosure, purified water is discharged through the hot water flow path without providing a separate purified water flow path.

As described above, the present disclosure includes a hot water module 160 which forms a heating flow path 161 through which the purified water passing through the filter 120 passes and instantaneously heats the purified water passing through the heating flow path 161 into hot water when hot water is ejected.

In addition, the present disclosure includes a hot water flow path 520 for guiding the hot water passing through the hot water module 160 to the water ejection nozzle 210 side. The hot water module 160 may be installed on the hot water flow path 520 to heat the purified water passing through the hot water flow path 520 into hot water. Both end portions of the heating flow path 161 are connected to the hot water flow path 520. The inlet-side heating flow path on one side may be connected to the filter-side hot water flow path, and the outlet-side heating flow path on the other side may be connected with the water ejection nozzle-side hot water flow path.

In addition, the controller 170 controls the operation of the hot water module 160.

At this time, when purified water is ejected, the controller 170 turns off the heating source of the hot water module 160, and the purified water discharged from the hot water module 160 passes through the hot water flow path 520 to be ejected to the water ejection nozzle 210. In other words, when the heating source of the hot water module 160 is turned off, when the purified water passes through the heating flow path 161 of the hot water module 160, the purified water is not heated but is discharged as a state of purified water. In addition, purified water may be supplied to the water ejection nozzle 210 through the hot water flow path 520.

In addition, when hot water is ejected, the controller 170 turns on the heating source of the hot water module 160, and the hot water discharged from the hot water module 160 passes through the hot water flow path 520 to be supplied to the water ejection nozzle 210. In other words, when the heating source of the hot water module 160 is turned on, the purified water is heated when passing through the heating flow path 161 of the hot water module 160 and discharged in the state of hot water. Then, the hot water may be supplied to the water ejection nozzle 210 through the hot water flow path 520.

In addition, in the hot water flow path 520, a hot water valve 620 for controlling the flow of purified water or hot water flowing through the hot water flow path 520 is mounted, and when hot water is ejected and purified water is ejected, the controller 170 opens the hot water valve 620.

In addition, the filter 120 and the hot water module 160 are connected through a water ejection flow path 530, and the water ejection flow path 530 has a flow rate adjusting valve 630 adjusting the flow rate of water flowing to the hot water module 160 is installed in the water ejection flow path 530.

The controller 170 is connected to the flow rate adjusting valve 630 to control the flow rate adjusting valve 630. In detail, the controller 170 may open or block the flow rate adjusting valve 630. In addition, the controller 170 may adjust the opening amount of the flow rate adjusting valve 630.

In addition, a temperature sensor 640 for detecting the temperature of water flowing toward the hot water module 160 through the water ejection flow path 530 may be installed in the water ejection flow path 530.

The temperature sensor 640 may be installed integrally with the flow rate adjusting valve 630.

In addition, the controller 170 is connected to the temperature sensor 640 and can receive the temperature of the purified water detected by the temperature sensor 640. In addition, by utilizing the received temperature information, it is possible to control the output applied to the hot water module 160.

In addition, a feed valve 650 for controlling the flow of purified water flowing through the water ejection flow path 530 after passing through the filter 120 may be installed in the water ejection flow path 530.

In addition, the controller 170 may be connected to the feed valve 650 to control the feed valve 650.

The flow rate sensor 660 for detecting the flow rate of the purified water flowing through the water ejection flow path 530 after passing through the filter 120 may be installed in the water ejection flow path 530.

In addition, the controller 170 may be connected to the flow rate sensor 660 to receive the flow rate information detected by the flow rate sensor 660. In addition, by utilizing the received flow rate information, it is possible to control the output applied to the hot water module 160.

As described above, the opening degree of the flow rate adjusting valve 630 may be adjusted by the controller 170.

Here, the 'opening degree' may mean an open degree of the flow rate adjusting valve 630. For example, in a case where the flow rate adjusting valve 630 is closed, the opening degree of the flow rate adjusting valve 630 can be viewed as 0, and in a case where the flow rate adjusting valve 630 is fully opened, the opening degree of the flow rate adjusting valve 630 can be viewed as 100.

The controller 170 may adjust the opening degree of the flow rate adjusting valve 630 when hot water is ejected to be different from the opening degree of the flow rate adjusting valve 630 when purified water is ejected.

For example, the controller 170 may adjust the opening degree of the flow rate adjusting valve 630 when hot water is ejected to be smaller than the opening degree of the flow rate adjusting valve 630 when purified water is ejected.

When hot water is ejected, since hot water of a desired temperature has to be generated through instantaneous heating, the flow rate of purified water flowing in the hot water module 160 is controlled to decrease.

In other words, when hot water is ejected, the controller 170 lowers the opening degree of the flow rate adjusting valve 630, so that the flow rate of purified water flowing in the hot water module 160 is reduced.

On the other hand, since there is no need to heat purified water when purified water is ejected, the flow rate of purified water flowing in the hot water module 160 is controlled to increase.

In other words, when purified water is ejected, the controller 170 increases the opening degree of the flow rate adjusting valve 630, so that the flow rate of purified water flowing in the hot water module 160 may increase.

As described above, if the opening degree of the flow rate adjusting valve 630 increases when purified water is ejected, compared to hot water ejection, there is an advantage in securing the ejection water flow rate when purified water is ejected.

Meanwhile, after the hot water is ejected, the hot water module 160 is in a state of being heated, and the hot water flow path 520 is in a state of being filled with hot water.

In this situation, when the user ejects purified water, the hot water in the hot water flow path 520 or the hot water module 160 is ejected through the water ejection nozzle 210 before the purified water is ejected.

Therefore, when the hot water is ejected and then the ejection of the purified water proceeds, before the purified water is ejected, it is necessary to drain the hot water which is ejected, or to lower the temperature of the water ejected through the water ejection nozzle 210.

For example, the drain flow path is branched in the hot water flow path 520 connecting the hot water module 160 and the water ejection nozzle 210, and a drain valve may be installed in the drain flow path.

In addition, the controller 170 may control the drain valve.

Accordingly, when purified water is ejected immediately after hot water is ejected, the controller 170 opens the drain valve, and before the purified water is ejected, the hot water in the hot water flow path 520 or the hot water module 160 may be drained to the drain flow path without ejecting to the water ejection nozzle 210.

In this embodiment, the controller 170 includes a timer 171, and after hot water is ejected, after a preset reference time has elapsed, when purified water is ejected, the controller 170 may block the drain valve and opens the hot water valve 620.

Here, the 'reference time' may be set variously. For example, the 'reference time' may be set to 30 minutes.

In addition, after the hot water is ejected, before the preset reference time has elapsed, when purified water is ejected, the controller 170 may open the cold water valve and the drain valve and block the hot water valve 620. Then, the hot water in the hot water flow path 520 or the hot water module 160 is drained through the drain flow path.

In addition, when a preset drain time has elapsed, the controller 170 may block the drain valve and open the hot water valve 620 to supply purified water to the water ejection nozzle 210.

As another example, the controller 170 may control the temperature of the hot water ejected to the water ejection nozzle 210 to be low through the cold water.

For this, cold water is required.

The water purifier according to one aspect of the present disclosure further includes a cold water flow path 540 having one side which is branched from the water ejection flow path 530 connecting between the filter 120 and the flow rate adjusting valve 630 and the other side which is connected to the side of the water ejection nozzle 210, and a cold water module 150 installed in the cold water flow path 540 to cool the purified water passing through the cold water flow path 540 into cold water.

For example, the cold water flow path 540 may be branched from the water ejection flow path 530 between the flow rate sensor 660 and the flow rate adjusting valve 630.

In addition, a cold water valve 670 may be installed in the cold water flow path 540 to control the flow of water branched from the water ejection flow path 530 and flowing to the cold water module 150.

In addition, the controller 170 may be connected to the cold water valve 670 to control the cold water valve 670.

For example, when purified water is ejected, the controller 170 may control the cold water valve 670 to be blocked and the hot water valve 620 to be opened.

As another example, when purified water is ejected, the controller 170 may control the cold water valve 670 and the hot water valve 620 to be opened at the same time.

In this embodiment, the controller 170 includes a timer 171, and after hot water is ejected, after a preset reference time has elapsed, when purified water is ejected, the controller 170 may block the cold water valve 670 and open the hot water valve 620.

Here, the 'reference time' may be set variously. For example, the 'reference time' may be set to 30 minutes.

In addition, after hot water is ejected, before a preset reference time has elapsed, when purified water is ejected, the controller 170 may open the cold water valve and the hot water valve at the same time.

Here, the 'reference time' may be set variously. For example, the 'reference time' may be set to 30 minutes.

In addition, after the hot water is ejected, before the reference time has elapsed, when purified water is ejected, the controller 170 may open the cold water valve 670 and the hot water valve 620 at the same time, wherein the cold water valve 670 is controlled to be blocked after being opened for the first time, and the hot water valve 620 is controlled to be opened for a second time longer than the first time.

Here, the 'first time' and the 'second time' may be set variously. For example, the 'first time' may be set to 3 seconds.

In addition, after the water discharged through the cold water flow path 540 and the hot water flow path 520 is merged, the water may be discharged through the water ejection nozzle 210.

As an example, the cold water flow path 540 and the hot water flow path 520 are merged at the end portion adjacent to the water ejection nozzle, so that the cold water and hot water flow through one common flow path, and then be ejected to the water ejection nozzle 210.

As another example, the cold water flow path 540 and the hot water flow path 520 are respectively connected to the water ejection nozzle 210, and the cold water and the hot water are merged in a chamber provided inside the water ejection nozzle 210 and then ejected.

Figure 6:
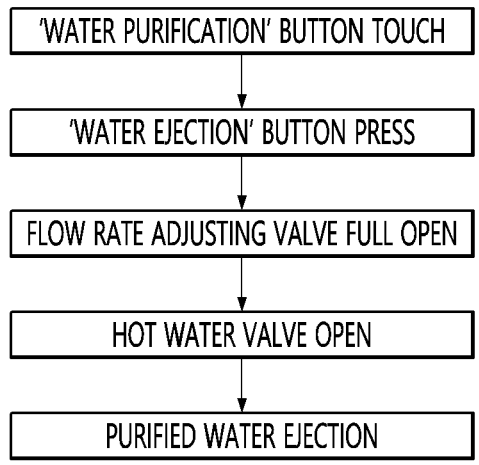
FIGS. 6 to 7 are flowcharts illustrating a purified water ejection process in the water purifier according to the present disclosure.
Figure 7:
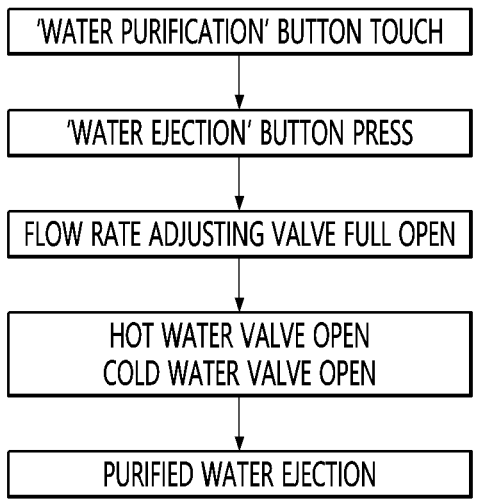

FIGS. 6 to 7 are flowcharts illustrating a purified water ejection process in the water purifier according to the present disclosure.

Hereinafter, with reference to FIGS. 5 to 7, the cold water, hot water, and purified water ejection process in the water purifier according to the present disclosure will be described.

First, the cold water ejection process will be described.

When the user selects cold water and presses the water ejection button, the controller recognizes this and opens the cold water valve 670. In addition, the water supply valve 610 and the feed valve 650 maintain an open state.

At this time, the hot water valve 620 is blocked.

Since the water supply valve 610 is in an open state, raw water flows in through the water supply flow path 510 connected to the water supply source, and after passing through the pressure reducing valve 680, the pressure of the raw water is adjusted downward.

Thereafter, while passing through the filter 120, the raw water is filtered with purified water and flows in the water ejection flow path 530.

After passing through the feed valve 650 and the flow rate sensor 660, the purified water flowing in the water ejection flow path 530 flows in the cold water flow path 540 and is cooled while passing through the cold water valve 670 and the cooling flow path 152 of the cold water module 150 and flows in the direction of the water ejection nozzle 210 as a state of cold water.

In addition, the user may receive cold water of a desired capacity through the water ejection nozzle 210.

Next, the hot water ejection process will be described.

When the user presses the hot water button and presses the water ejection button, the controller recognizes this and opens the hot water valve 620. In addition, the water supply valve 610 and the feed valve 650 maintain an open state.

At this time, the cold water valve 670 is blocked. In addition, power is supplied to the heating source of the hot water module 160.

Since the water supply valve 610 is in an open state, raw water flows in through the water supply flow path 510 connected to the water supply source, and after passing through the pressure reducing valve 680, the pressure of the raw water is adjusted to be lowered.

Thereafter, while passing through the filter 120, the raw water is filtered with purified water and flows in the water ejection flow path 530.

After passing through the feed valve 650 and the flow rate sensor 660, the purified water flowing in the water ejection flow path 530 flows in the hot water flow path 520. Thereafter, the purified water flowing in the hot water flow path 520 is heated while passing through the flow rate adjusting valve 630 and the heating flow path 161 of the hot water module 160 and flows toward the water ejection nozzle 210 in the state of hot water.

In addition, the user may receive hot water of a desired temperature and capacity through the water ejection nozzle 210.

Next, the purified water ejection process according to FIG. 6 will be described.

When the user presses the water purification button and presses the water ejection button, the controller recognizes this and opens the hot water valve 620. In addition, the water supply valve 610 and the feed valve 650 maintain an open state.

At this time, the cold water valve 670 is blocked. In addition, power is not supplied to the heating source of the hot water module 160 and is blocked.

Since the water supply valve 610 is in an open state, raw water flows in through the water supply flow path 510 connected to the water supply source, and after passing through the pressure reducing valve 680, the pressure of the raw water is adjusted to be lowered.

Thereafter, while passing through the filter 120, the raw water is filtered with purified water and flows in the water ejection flow path 530.

After passing through the feed valve 650 and the flow rate sensor 660, the purified water flowing in the water ejection flow path 530 flows in the hot water flow path 520. Thereafter, the purified water flowing in the hot water flow path 520 passes through the flow rate adjusting valve 630 and the heating flow path 161 of the hot water module 160 and flows toward the water ejection nozzle 210 as a state of purified water.

In addition, the user may receive purified water of a desired capacity through the water ejection nozzle 210.

At this time, the flow rate adjusting valve 630 may be completely open.

Next, the purified water ejection process according to FIG. 7 will be described.

When the user presses the water purification button and presses the water ejection button, the controller recognizes this and opens the hot water valve 620. In addition, the water supply valve 610 and the feed valve 650 maintain an open state.

At this time, after the previous hot water is ejected, before the preset reference time has elapsed, when the purified water is ejected, the controller 170 also opens the cold water valve 670. In other words, the hot water valve 620 and the cold water valve 670 are opened at the same time.

On the other hand, after the previous hot water is ejected, after a preset reference time has elapsed, when the purified water is ejected, the controller 170 blocks the cold water valve 670 and opens only the hot water valve 620.

In addition, power is not supplied to the heating source of the hot water module 160 and is blocked.

Since the water supply valve 610 is in an open state, raw water flows in through the water supply flow path 510 connected to the water supply source, and after passing through the pressure reducing valve 680, the pressure of the raw water is adjusted to be lowered.

Thereafter, while passing through the filter 120, the raw water is filtered to be purified water and flows in the water ejection flow path 530.

After passing through the feed valve 650 and the flow rate sensor 660, the purified water flowing in the water ejection flow path 530 flows in the hot water flow path 520 and the cold water flow path 540, respectively. Thereafter, the purified water flowing in the hot water flow path 520 passes through the flow rate adjusting valve 630 and the heating flow path 161 of the hot water module 160, and flows toward the water ejection nozzle 210 as a state of purified water. Then, the purified water flowing in the cold water flow path 540 is cooled while passing through the cold water valve 670 and the cooling flow path 152 of the cold water module 150 and flows toward the water ejection nozzle 210 as a state of cold water.

At this time, the hot water remaining in the hot water flow path 520 and the hot water module 160 is discharged through the water ejection nozzle 210 after merging with the cold water discharged through the cold water flow path 540, and the user may receive purified water, not hot water, through the water ejection nozzle 210.

In addition, when the preset time has elapsed, the controller 170 closes the cold water valve 670, the ejection of the cold water is blocked, and only the purified water that has passed through the hot water flow path 520 and the hot water valve 630 is ejected through the water ejection nozzle 210.

According to this, through the hot water flow path, when the hot water flow path is used as a water purification flow path, by residual hot water, the problem that hot water or lukewarm water is initially discharged when purified water is ejected can be solved.

According to the present disclosure as described above, there is an advantage that it is possible to reduce the material cost due to the provision of the purified water flow path and the purified water valve by implementing to eject hot water and purified water through the hot water flow path without having a separate purified water flow path and water purification valve.

In addition, since the configuration of the purified water flow path and the purified water valve can be deleted, the space utilization inside the water purifier can increase, and there is an advantage that the water purifier can be miniaturized.

In addition, it is possible to delete the configuration of the purified water flow path and the purified water valve, there is also an advantage that can reduce maintenance costs, such as pipe replacement costs that are carried out periodically.

In addition, there is an advantage that can increase the water ejection flow rate of purified water while satisfying the temperature condition of hot water by adjusting the opening degree of the flow rate adjusting valve differently when hot water is ejected and purified water is ejected.

In addition, in a case where purified water is ejected after hot water is ejected, the temperature of water ejected through cold water is lowered so that the temperature of purified water ejected by residual hot water does not increase, and thus there is also an advantage that the temperature condition of ejected purified water is maintained in a satisfactory state.

What is claimed is:

1. A water purifier that ejects hot water and purified non-heated water comprising:
   a housing;
   a filter provided inside the housing to purify water;
   a nozzle positioned outside of the housing, the nozzle configured to eject hot water and to eject purified non-heated water;
   a hot water module forming a heating flow path through which the purified non-heated water passes, the hot water module configured to heat the purified non-heated water so as to become hot water;
   a first valve configured to adjust a flow rate of water flowing to the hot water module;
   a hot water flow path coupled between the hot water module and the nozzle;
   a second valve installed on the hot water flow path, and configured to control flow of the hot water and flow of the purified non-heated water; and
   a controller configured to control operation of the hot water module, the first valve, and the second valve,
   wherein when the purified non-heated water is to be ejected from the nozzle, the controller is configured to:
      control a heating source of the hot water module to be off,
      control the first valve to be open so the purified non-heated water flows to the hot water module,
      control the second valve to be open so the purified non-heated water flows through the hot water flow path and the second valve to be ejected from the nozzle,
   wherein when the hot water is to be ejected from the nozzle, the controller is configured to:
      control the first valve to be open so the purified non-heated water flows to the hot water module,
      control the heating source of the hot water module to be on so the purified non-heated water is heated to become hot water,
      control the second valve to be open so the hot water flows through the hot water flow path and the second valve in order to be ejected from the nozzle,
   wherein the controller is configured to adjust an opening degree of the first valve based on the hot water to be ejected from the nozzle or the purified non-heated water to be ejected from the nozzle, and wherein, when the hot water is to be ejected from the nozzle, the opening degree of the first valve is adjusted to be smaller than when the purified non-heated water is to be ejected from the nozzle, wherein hot water is to pass through at least a portion of the hot water flow path and the second valve and is to be ejected from the nozzle, and the purified non-heated water is to be ejected from the nozzle after passing through the hot water flow path and the second valve without having a separate purified water flow path and a separate water purification valve, and the purified non-heated water is introduced into the hot water flow path when hot water is to be ejected from the nozzle, and the purified non-heated water is introduced into the hot water flow path without having a separate purified water flow path and a separate water purification valve when the purified non-heated water is to pass through the heating flow path of the heating module and the second valve, and is to be ejected from the nozzle.

2. The water purifier of claim 1,
wherein, when hot water is to be ejected from the nozzle, the controller is to control the second valve to be open, and
when the purified non-heated water is to be ejected from the nozzle, the controller is to control the second valve to be open.

3. The water purifier of claim 1,
wherein the filter and the hot water module are connected through a water ejection flow path, and
wherein the first valve is installed in the water ejection flow path.

4. The water purifier of claim 3,
wherein a temperature sensor configured to sense temperature of water flowing toward the hot water module through the water ejection flow path is installed in the water ejection flow path.

5. The water purifier of claim 3,
wherein a feed valve configured to control flow of the purified non-heated water flowing through the water ejection flow path after passing through the filter is installed in the water ejection flow path.

6. The water purifier of claim 3,
wherein a flow rate sensor configured to sense a flow rate of the purified non-heated water flowing through the water ejection flow path after passing through the filter is installed in the water ejection flow path.

7. The water purifier of claim 3,
wherein, when the purified non-heated water is to be ejected from the nozzle, the opening degree of the first valve is adjusted to the maximum.

8. The water purifier of claim 3, further comprising:
a cold water flow path having one side branched from the water ejection flow path between the filter and the first valve and the other side connected to the nozzle; and
a cold water module installed in the cold water flow path to cool the purified non-heated water passing through the cold water flow path to cold water.

9. The water purifier of claim 8,
wherein a cold water valve configured to control flow of water branched from the water ejection flow path and flowing to the cold water module is installed in the cold water flow path.

10. The water purifier of claim 9,
wherein, when the purified non-heated water is to be ejected from the nozzle, the cold water valve and the second valve are simultaneously opened.

11. The water purifier of claim 9,
wherein the controller includes a timer, and
wherein, after hot water is ejected after a reference time has elapsed when the purified non-heated water is to be ejected from the nozzle, the controller shuts off the cold water valve and opens the second valve.

12. The water purifier of claim 9,
wherein the controller includes a timer, and
wherein, after hot water is ejected before a reference time has elapsed when the purified non-heated water is to be ejected from the nozzle, the cold water valve and the second valve are opened at the same time.

13. The water purifier of claim 12,
wherein, after hot water is ejected before a reference time has elapsed when the purified non-heated water is to be ejected from the nozzle,
the cold water valve and the second valve are opened at the same time,
the cold water valve is closed after being opened for the first time, and
the second valve is opened for a second time longer than the first time.

14. The water purifier of claim 8,
wherein the water discharged through the cold water flow path and the hot water flow path are merged and then discharged through the nozzle.

15. The water purifier of claim 1, further comprising:
a water ejection module formed to protrude in front of a water purifier main body, and
wherein the nozzle is formed to protrude downward of the water ejection module.

16. The water purifier of claim 15, further comprising:
a manipulator configured to receive a water ejection command from a user.

17. The water purifier of claim 16,
wherein the manipulator is provided on an upper surface of at least one of the water ejection module or the water purifier main body.

18. The water purifier of claim 16,
wherein the manipulator including:
a capacity button for selecting a water ejection capacity;
a hot water button for selecting hot water, and for further selecting the temperature of the hot water to be ejected from the nozzle;
a water purifying button for selecting purified non-heated water;
a cold water button for selecting cold water;
a continuous button for selecting continuous water ejection; and
a washing button for inputting a sterilization command and/or a washing command.

19. The water purifier of claim 16,
wherein the manipulator is formed to be inclined downward from a rear to a front of the manipulator.

* * * * *